United States Patent
Fukushima

(12) 
(10) Patent No.: US 8,896,866 B2
(45) Date of Patent: Nov. 25, 2014

(54) INFORMATION PROCESSING APPARATUS AND CONTROL METHOD THEREOF

(75) Inventor: Kenta Fukushima, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 88 days.

(21) Appl. No.: 13/566,294

(22) Filed: Aug. 3, 2012

(65) Prior Publication Data

US 2013/0050751 A1  Feb. 28, 2013

(30) Foreign Application Priority Data

Aug. 26, 2011 (JP) ................................. 2011-185256

(51) Int. Cl.
 *G06F 15/00* (2006.01)
 *G06F 3/12* (2006.01)
 *H04N 1/00* (2006.01)

(52) U.S. Cl.
 CPC .... *H04N 1/00962* (2013.01); *H04N 2201/0075* (2013.01); *G06F 3/1257* (2013.01); *H04N 1/00244* (2013.01); *H04N 1/00222* (2013.01); *H04N 1/00482* (2013.01); *H04N 2201/0039* (2013.01); *G06F 3/1204* (2013.01); *H04N 2201/0094* (2013.01); *H04N 1/0097* (2013.01); *G06F 3/1285* (2013.01); *G06F 3/1234* (2013.01)
 USPC ........................................................ 358/1.15

(58) Field of Classification Search
 CPC ............................. G06F 3/1273; G06F 3/1258
 USPC ........................................................ 358/1.15
 See application file for complete search history.

(56) References Cited

U.S. PATENT DOCUMENTS

2008/0212131 A1 * 9/2008 Osada .......................... 358/1.15

FOREIGN PATENT DOCUMENTS

JP  2010-68343 A  3/2010

* cited by examiner

*Primary Examiner* — Saeid Ebrahimi Dehkordy

(74) *Attorney, Agent, or Firm* — Fitzpatrick, Cella, Harper & Scinto

(57) ABSTRACT

An information processing apparatus according to this invention, when accepting an instruction to execute a job based on a history of a previously executed job, identifies settings allowed to be reflected to the job to be executed based on the instruction from among settings of the previously executed job. The information processing apparatus executes the job based on the instruction according to the settings obtained by reflecting the identified settings to default settings of the job to be executed.

14 Claims, 8 Drawing Sheets

FIG. 8

JOB SETTINGS INHERITED FROM PREVIOUSLY EXECUTED JOB ARE AS FOLLOWS.

- COLOR MODE: MONOCHROME
- IMPOSITION SETTING: 2in1

FOLLOWING JOB SETTINGS ARE NOT INHERITED FROM PREVIOUSLY EXECUTED JOB.

- COLOR MODE: MONOCHROME → FULL-COLOR
- IMPOSITION SETTING: 2in1 → OFF

OK

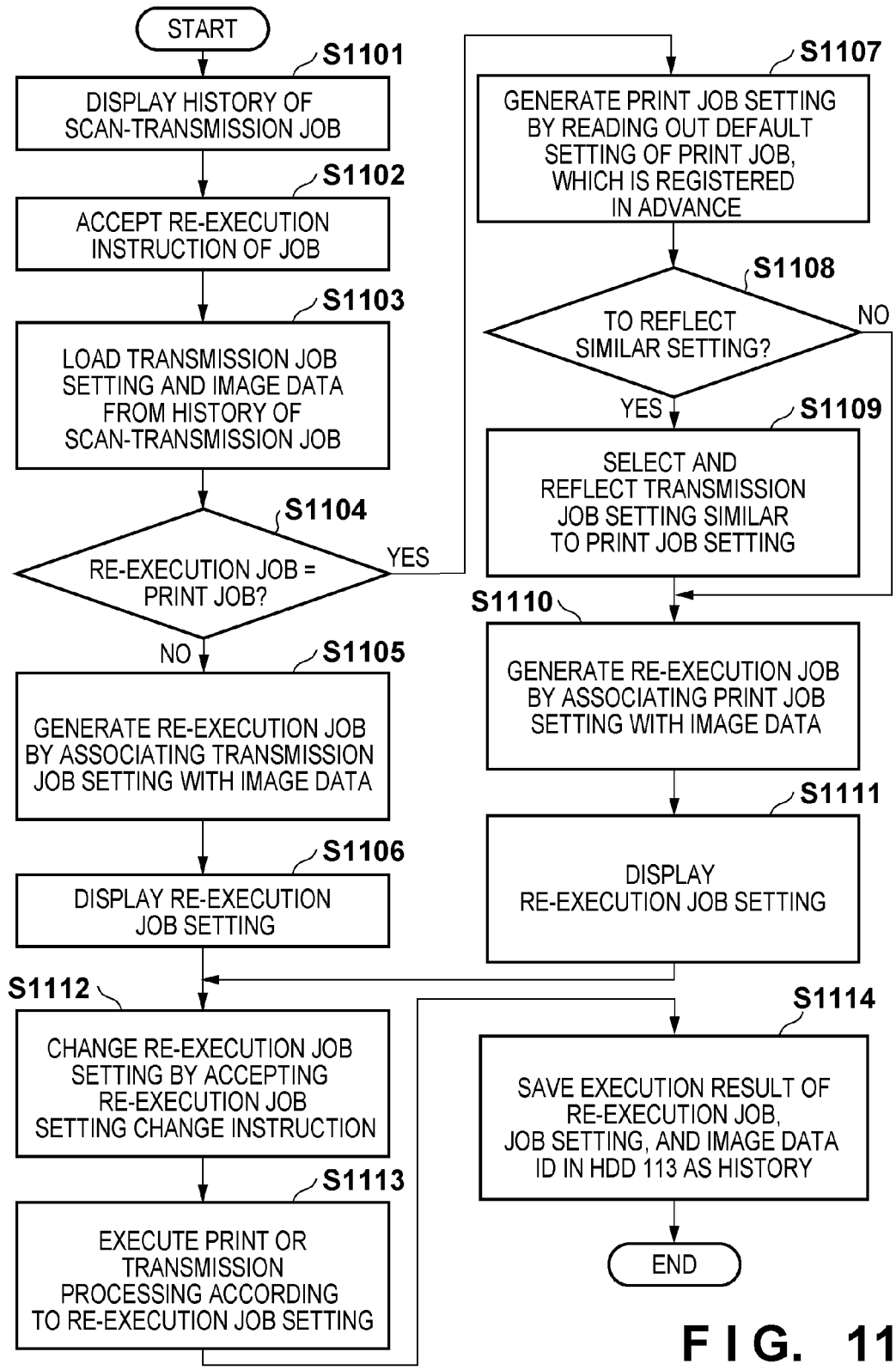
F I G. 11

INFORMATION PROCESSING APPARATUS AND CONTROL METHOD THEREOF

BACKGROUND OF THE INVENTION

1. Field of the Invention

The present invention relates to an information processing apparatus which executes another job based on a history of a previously executed job, and a control method thereof.

2. Description of the Related Art

Conventionally, in an MFP (Multi-Function Peripheral) including a printer function, scanner function, FAX function, and the like, image data of an execution job of print or transmission processing is left in a memory without being erased, and processing can be quickly executed based on the data in the memory in response to an instruction of a re-execution job of re-print or re-transmission processing. In this re-execution job, settings such as the number of copies to be printed and a destination can be changed in place of executing the processing based on the same settings as those of an original job.

When re-executing a job, the user often desires to leave most of the settings of the original job intact and to change only some settings. In consideration of this, a related art which uses settings of operations common to an original job intact upon using job settings in a re-execution job is available (for example, see Japanese Patent Laid-Open No. 2010-68343).

However, in the related art, when a job is re-executed by mutually using settings of jobs such as print and transmission jobs, which execute different operations, the settings of a previously executed job cannot often be used intact at the time of re-execution. For this reason, when a job of a type different from that of a previously executed job is to be re-executed using settings of the previously executed job, these settings are often required to be changed, resulting in troublesome operations for the user.

SUMMARY OF THE INVENTION

The present invention solves the aforementioned problems.

A characteristic feature of the present invention is to provide a technique which applies settings of a job included in a history of a previously executed job to another job having a type different from the previously executed job, and executes the other job.

According to one aspect of the present invention, there is provided an information processing apparatus comprising: a first execution unit configured to execute a first job; an acceptance unit configured to accept an instruction to execute a second job based on a history of the first job executed by the first execution unit; an identifying unit configured to, when the acceptance unit accepts the instruction, identify settings allowed to be reflected to the second job indicated by the instruction accepted by the acceptance unit from among settings of the first job executed by the first execution unit; and a second execution unit configured to execute the second job according to the settings identified by the identifying unit.

According to another aspect of the present invention, there is provided a control method of an information processing apparatus, comprising: a first executing step of executing a first job; an accepting step of accepting an instruction to execute a second job based on a history of the first job executed in the first executing step; an identifying step of identifying settings allowed to be reflected to the second job indicated by the instruction accepted in the accepting step from among settings of the first job executed in the first executing step when the instruction is accepted in the accepting step; and a second executing step of executing the second job according to the settings identified in the identifying step.

According to the present invention, upon execution of another job based on a history of a previously executed job, even when a job type of the other job is different from that of the previously executed job, the job can be executed using settings of job included in a job history. Thus, troublesome operations for the user can be eliminated.

Further features of the present invention will become apparent from the following description of exemplary embodiments (with reference to the attached drawings).

BRIEF DESCRIPTION OF THE DRAWINGS

FIG. 8 shows an example of a setting confirmation screen displayed by the MFP according to the first embodiment of the present invention;

FIG. 9 shows an example of a setting confirmation screen displayed by the MFP according to the first embodiment of the present invention;

FIG. 11 is a flowchart for explaining the operation executed when the MFP according to the second embodiment of the present invention executes a re-execution job from a jog history screen.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention. Note that this embodiment will exemplify, as an example of an information processing apparatus of the present invention, an MFP (Multi-Function Peripheral) as an image forming apparatus. However, the information processing apparatus of the present invention is not limited to such MFP.

[First Embodiment]

Figure 1:
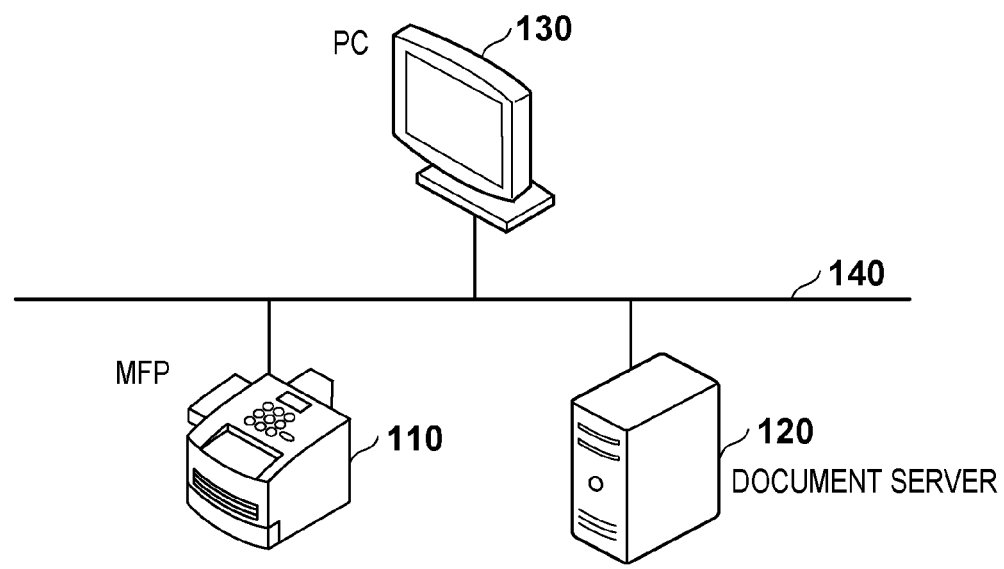
FIG. 1 is a view showing an example of the system arrangement according to the first embodiment of the present invention.

FIG. 1 shows an example of the system arrangement according to the first embodiment of the present invention. In this system, an MFP (Multi-Function Peripheral) 110, document server 120, and PC 130 are connected to each other via a network 140.

Figure 2:
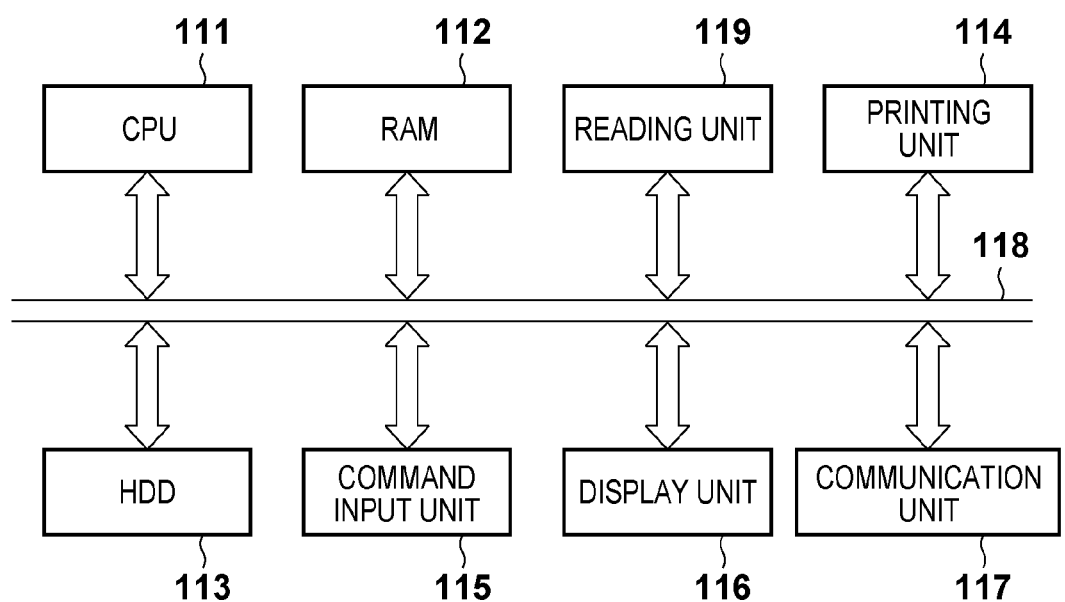
FIG. 2 is a block diagram showing the arrangement of an MFP according to the first embodiment of the present invention.

FIG. 2 is a block diagram showing the arrangement of the MFP 110 according to the first embodiment of the present invention.

A CPU 111 controls the operation of the overall MFP 110 by executing programs expanded on a RAM 112. The RAM 112 stores programs to be executed by the CPU 111, and provides a work area for the CPU 111. An HDD (Hard Disc Drive) 113 stores an OS and various programs, and these programs and the like are loaded and expanded on the RAM 112 by a boot program. In this embodiment, the HDD 113 is a non-volatile memory. A command input unit 115 is operated by a user (including a user and installation person), and transfers commands input by the user to the CPU 111. A display unit 116 displays a UI (User Interface) screen and the like. A reading unit 119 is, for example, a scanner which reads an image on a document as digital data. A communication unit 117 communicates with other devices via a network. A printing unit 114 prints an image on a printing medium by, for example, an electrophotography system, ink-jet system, or the like. A main bus 118 connects the aforementioned devices with the CPU 111.

Note that in the MFP 110 of this embodiment, the CPU 111 can execute various operations according to this embodiment by controlling the RAM 112, HDD 113, command input unit 115, display unit 116, communication unit 117, and reading unit 119 via the main bus 118.

Figure 3:
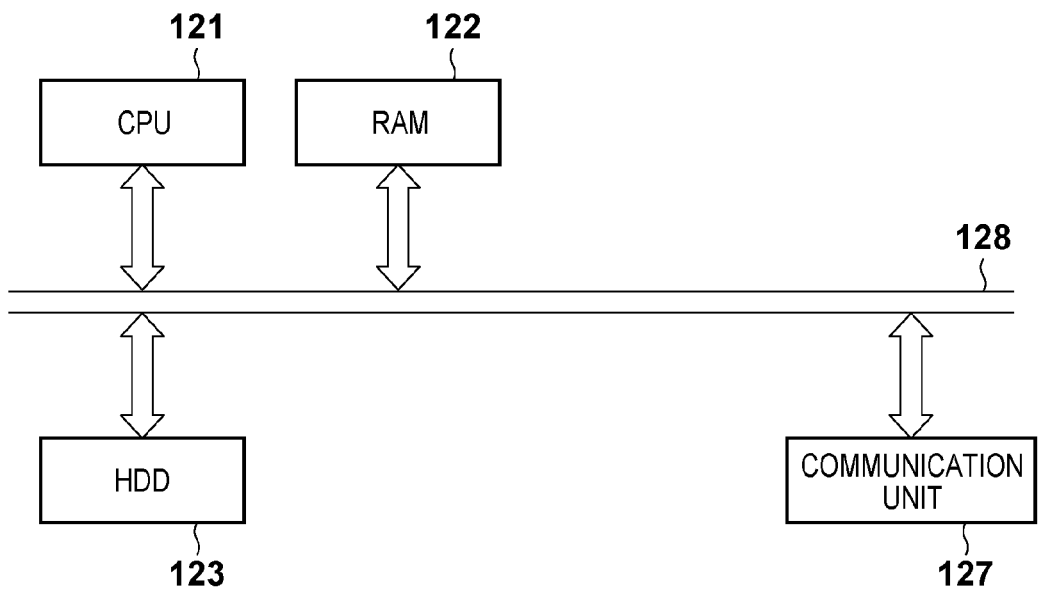
FIG. 3 is a block diagram for explaining the arrangement of a document server according to the first embodiment of the present invention.

FIG. 3 is a block diagram for explaining the arrangement of the document server 120 according to the first embodiment of the present invention.

A CPU 121 controls the operation of the overall document server 120 by executing programs expanded on a RAM 122. The RAM 122 stores programs to be executed by the CPU 121, and provides a work area for the CPU 121. An HDD 123 stores an OS and various programs, and these programs and the like are loaded and expanded on the RAM 122 by a boot program. A communication unit 127 communicates with other devices via a network. A main bus 128 connects the aforementioned devices with the CPU 121.

Note that in the document server 120 according to this embodiment, the CPU 121 executes operations according to this embodiment by controlling the RAM 122, HDD 123, and communication unit 127 via the main bus 128, unless otherwise specified.

Figure 4:
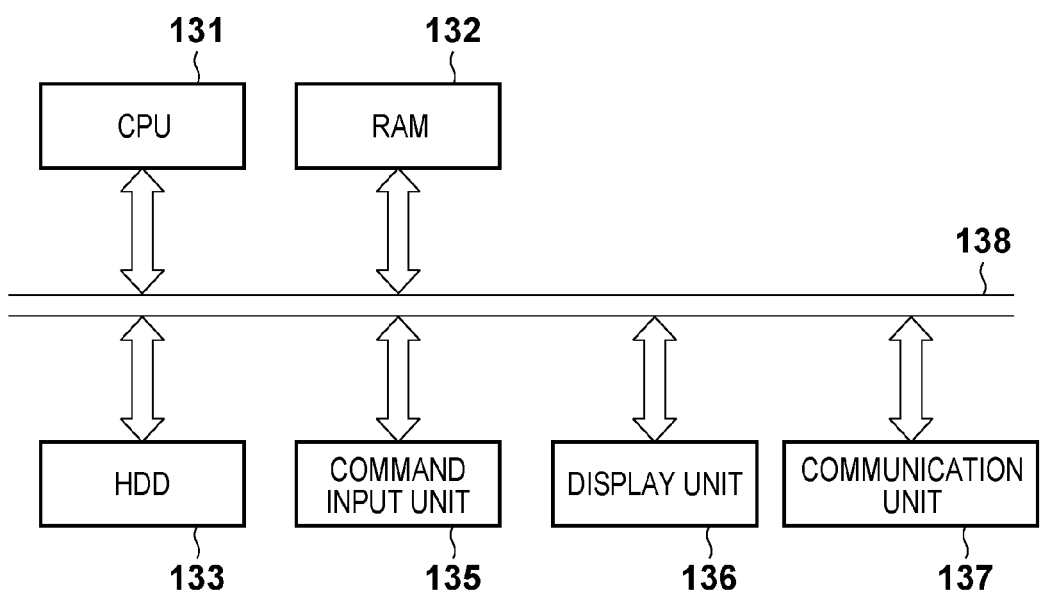
FIG. 4 is a block diagram showing the arrangement of a PC according to the first embodiment of the present invention.

FIG. 4 is a block diagram showing the arrangement of the PC 130 according to the first embodiment of the present invention.

A CPU 131 controls the operation of the overall PC 130 by executing programs expanded on a RAM 132. The RAM 132 stores programs to be executed by the CPU 131, and provides a work area for the CPU 131. An HDD 133 stores an OS and various programs, and these programs and the like are read out and expanded on the RAM 132 by a boot program. A command input unit 135 is operated by a user, and transfers commands input by the user to the CPU 131. A display unit 136 displays a UI (User Interface) screen and the like. A communication unit 137 communicates with other devices via a network. A main bus 138 connects the aforementioned devices with the CPU 131.

Note that in the PC 130 according to this embodiment, the CPU 131 executes processes according to this embodiment by controlling the RAM 132, HDD 133, command input unit 135, display unit 136, and communication unit 137 via the main bus 138, unless otherwise specified.

In this embodiment, the user can also instruct to re-execute a job previously executed by the MFP 110 via a job history screen which displays an execution history of a print job which controls the MFP 110 to execute print processing of image data transmitted from the PC 130 to the MFP 110, and a copy job which is instructed by the user by operating the MFP 110. Also, at the time of re-execution of a print job or copy job, the MFP 110 can execute not only the print job or copy job but also a job of a different type (for example, a transmission job which transmits an image file to the document server 120).

Figure 5:
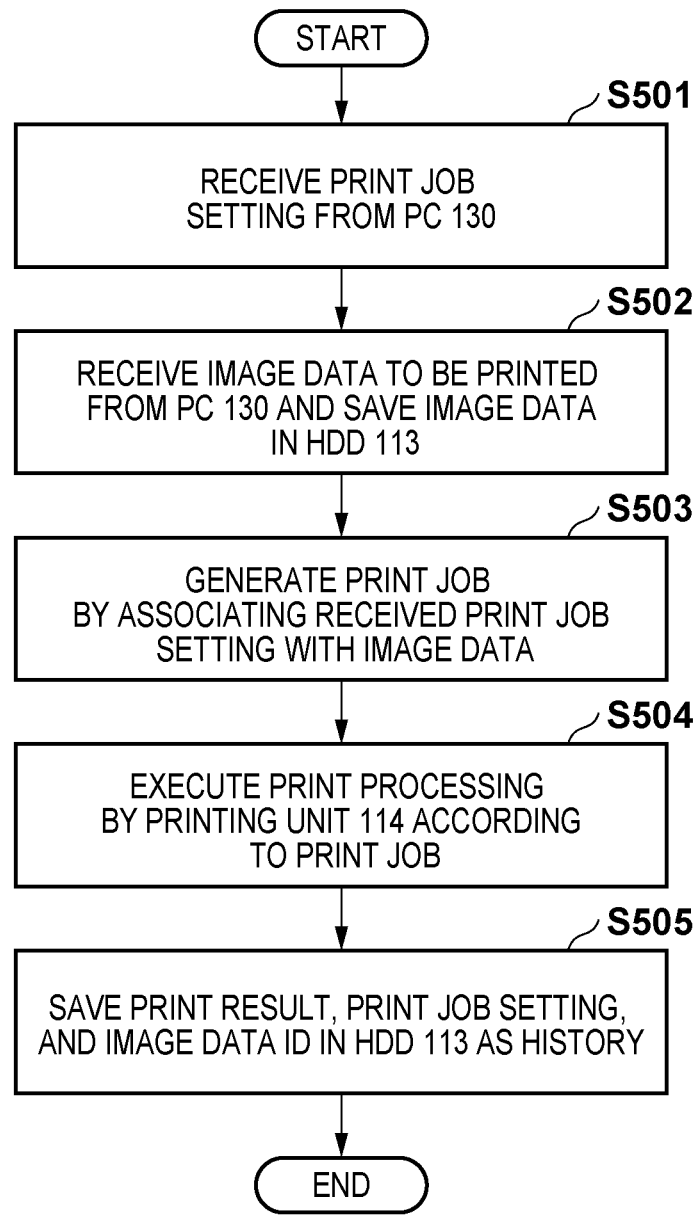
FIG. 5 is a flowchart for explaining the operation executed when the MFP according to the first embodiment of the present invention receives a print instruction from the PC and executes print processing.

FIG. 5 is a flowchart for explaining the operation executed when the MFP 110 according to the first embodiment of the present invention receives a print instruction from the PC 130 and executes print processing. Note that a program required to implement this processing is installed in the HDD 113, is expanded on the RAM 112 when it is executed, and is executed under the control of the CPU 111.

In step S501, the CPU 111 receives print job settings from the PC 130 via the communication unit 117. The process advances to step S502, and the CPU 111 receives image data to be printed from the PC 130 via the communication unit 117 and saves that image data in the HDD 113. An ID (identifier) is assigned to this saved image data. The corresponding image data can be uniquely identified using that ID, and can be read out from the HDD 113. Note that examples of reception protocols in steps S501 and S502 include LPR and RAW. After the image data is saved in step S502, the process advances to step S503, and the CPU 111 generates a print job according to the print job settings and image data received from the PC 130.

After the print job is generated in this way, the process advances to step S504, and the CPU 111 controls the printing unit 114 to execute print processing of an image according to that print job. Upon completion of the print processing, the process advances to step S505, and the CPU 111 saves information indicating a print job execution result in step S504, the print job settings, and the image data ID in the HDD 113 as a history of the print job, thus ending this processing.

In this manner, upon printing an image on a printing sheet based on image data received from the PC 130, the MFP 110 can store the image data and the print job settings used in the print processing in the HDD 113. Since the HDD 113 is a non-volatile memory, the storage contents of the HDD 113 are held independently of a power-ON/OFF state of the MFP 110.

Figure 6:
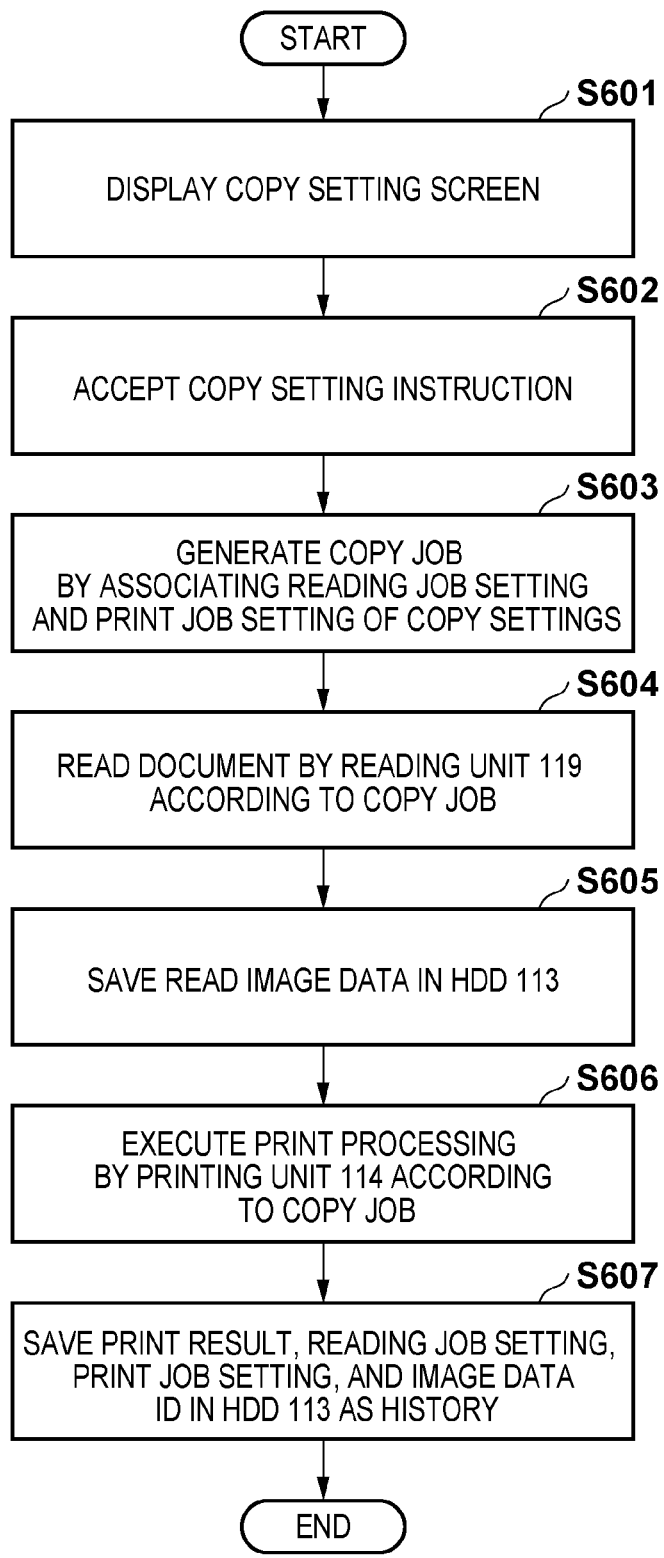
FIG. 6 is a flowchart for explaining the operation executed when the MFP according to the first embodiment of the present invention executes copy processing.

FIG. 6 is a flowchart for explaining the operation executed when the MFP 110 according to the first embodiment of the present invention executes copy processing. Note that a program required to implement this processing is installed in the HDD 113, is expanded on the RAM 112 when it is executed, and is executed under the control of the CPU 111.

In step S601, the CPU 111 displays a screen which prompts the user to input copy settings on the display unit 116. The process then advances to step S602, and the CPU 111 accepts a copy setting instruction from the command input unit 115. After this copy setting instruction is accepted, the process advances to step S603, and the CPU 111 acquires reading job settings and print job settings from the copy settings to generate a copy job based on the acquired settings.

After the copy job is generated in this way, the process advances to step S604, and the CPU 111 controls the reading unit 119 to read a document according to that copy job. The process advances to step S605, and the CPU 111 saves the read image data in the HDD 113. An ID is assigned to the saved image data. The corresponding image data can be uniquely identified using that ID, and can be read out from the HDD 113.

After the image data is saved in this way, the process advances to step S606, and the CPU 111 controls the printing unit 114 to execute print processing of an image according to the copy job generated in step S603. Upon completion of the print processing, the process advances to step S607, and the CPU 111 saves information indicating a print result in step S606, the reading job settings, print job settings, and the image data ID in the HDD 113 as a history of the copy job, thus ending this processing.

In this way, upon instruction of the copy processing, the reading job settings, the image data and print job settings, and the information indicating the print result of the copy processing can be stored in the HDD 113. Since the HDD 113 is a non-volatile memory, the storage contents of the HDD 113 are held independently of a power-ON/OFF state of the MFP 110.

Figure 7:
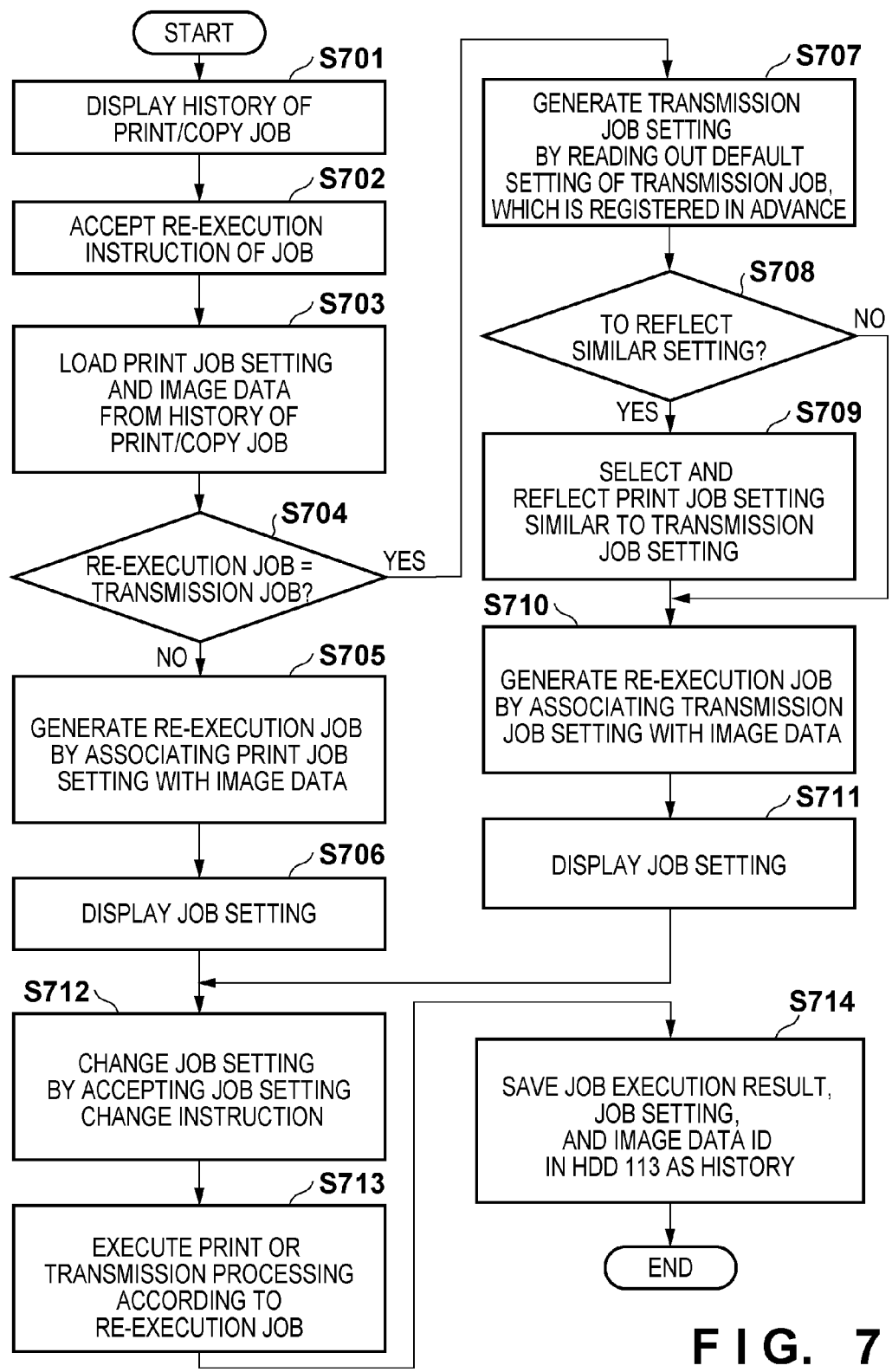
FIG. 7 is a flowchart for explaining the operation executed when the MFP according to the first embodiment of the present invention executes a re-execution job from a jog history screen.

FIG. 7 is a flowchart for explaining the operation executed when the MFP 110 according to the first embodiment of the present invention executes a re-execution job (second job) from a job history screen. Note that a program required to implement this processing is installed in the HDD 113, is expanded on the RAM 112 when it is executed, and is executed under the control of the CPU 111.

In step S701, the CPU 111 reads out, from the HDD 113, the contents of the history of the print job (first job) described using FIG. 5 or that of the copy job (first job) described using FIG. 6, which are stored in the HDD 113, and displays the readout contents on the display unit 116. In this case, a button used to instruct to execute "re-print" or "re-transmission" is displayed in correspondence with the history of each job. The process then advances to step S702, and the CPU 111 accepts an instruction to the "re-print" or "re-transmission" button displayed in step S701, which instruction is input from the command input unit 115. Upon acceptance of this instruction, the process advances to step S703, and the CPU 111 acquires, from the HDD 113, the print job settings and image data ID included in the history of the job (first job) corresponding to the accepted instruction. At this time, the CPU 111 acquires the image data from the HDD 113 based on that image data ID.

The process then advances to step S704, and the CPU 111 determines whether the instruction accepted in step S702 is a "re-print" or "re-transmission" instruction (whether or not a transmission job is instructed). If it is determined that the accepted instruction is the "re-print" instruction ("NO" in step S704), the process advances to step S705, and the CPU 111 generates a re-print job according to the print job setting and image data acquired in step S703. After the re-print job is generated, the process advances to step S706, and the CPU 111 displays the setting contents of that re-print job on the display unit 116. Then, the process advances to step S712 (to be described later).

On the other hand, if the "re-transmission" instruction is determined in step S704 ("YES" in step S704), the process advances to step S707, and the CPU 111 reads out default settings of a transmission job from the HDD 113 to generate transmission job settings. The default settings of the transmission job are saved in advance in, for example, the HDD 113. When the CPU 111 transmits image data, it displays the default settings on the display unit 116. Note that the reason why the default settings of the transmission job are used in this step is that the job histories include those of only the copy and print jobs, and do not include any transmission job.

After the transmission job settings are generated in step S707 in this way, the process advances to step S708, and the CPU 111 determines whether or not settings similar to the transmission job settings of the print job settings acquired in step S703 are to be reflected to the transmission job settings. This determination can be implemented by a method using switch information saved in advance in, for example, the HDD 113. This switch information is obtained by saving the contents accepted from the user via the command input unit 115 independently of the operations according to this embodiment, and includes information indicating whether or not respective settings of the print job are reflected to settings of another job (transmission job). Also, the determination in step S708 can be implemented by a method of displaying a selection screen on the display unit 116, accepting an input from the user via the command input unit 115, and making determination according to that user instruction after step S707. With this determination, when the print job settings include settings which are not suited as the transmission job settings, the transmission job can be executed using the default settings of the transmission job without reflecting those settings to the transmission job settings.

If "to reflect" the similar settings is selected in step S708, the process advances to step S709. In step S709, the CPU 111 identifies (selects) settings which can be used in the transmission job settings generated in step S707 from the print job settings acquired in step S703, and overwrites the identified settings on the transmission job settings. Thus, the CPU 111 reflects the identified settings to the transmission job settings. Then, the process advances to step S710. On the other hand, if "not to reflect" the similar settings is determined in step S708, the process jumps to step S710.

An example in which the print job settings are overwritten on the transmission job settings includes the following cases.

A color setting of the print job is overwritten on that of image data of the transmission job.

A resolution setting of the print job is overwritten on that of the transmission job.

An enlargement/reduction setting for original image data of the print job is overwritten on that for image data of an image file to be transmitted by the transmission job.

A print setting of a page number of the print job is overwritten on a setting for assigning a page number to image data of an image file of the transmission job.

An imposition (print layout) setting of the print job is overwritten on that for image data of an image file of the transmission job.

In another example, the transmission job settings are generated by adopting the print job settings as attribute information of an image file of the transmission job. For example, this example includes the following cases.

An enlargement/reduction setting for original image data of the print job is overwritten on a print setting (enlargement/reduction setting) of an image file included in the transmission job.

A print setting of a page number of the print job is overwritten on a print setting (page number assignment setting) of an image file included in the transmission job.

An imposition setting of the print job is overwritten on a print setting (imposition setting) of an image file included in the transmission job.

An original document name of the print job (in case of the print job input from the PC 130) is overwritten on a setting of a document name of an image file included in the transmission job. In this case, an extension of an image file of the transmission job is given in place of that of an original document name.

An example in which a setting of the print job is not overwritten on that of the transmission job includes the following cases.

A setting of the number of copies of the print job is not overwritten (since the number of copies to be printed is not related to the transmission job (that is, a person who received this transmission job)).

A staple setting of the print job is not overwritten (since it is related to post-processing of print processing).

A booklet setting of the print job is not overwritten (since it is related to post-processing of print processing).

When a given setting of the print job is overwritten on that of the transmission job to unwantedly generate a setting which cannot be executed by the authority of the user who issued a re-execution instruction, that setting is not overwritten.

In this way, the process advances to step S710, and the CPU 111 generates a transmission job (second job) according to the transmission job settings generated in step S707 or S708 and the image data acquired in step S703. After the transmission job is generated in this way, the process advances to step S711, and the CPU 111 displays the setting contents of that transmission job on the display unit 116. The process then advances to step S712. In the display processing in step S711, when the default settings of the transmission job generated in step S707 have been changed by the processing in step S709, the changed settings and other settings which are not changed are identifiably displayed. Thus, the user can confirm the contents of the settings changed from the default settings of the transmission job at a glance.

FIG. 8 shows an example of a setting confirmation screen displayed by the MFP 110 according to the first embodiment. FIG. 8 displays a color mode setting "monochrome" and imposition setting "2in1" as settings inherited from the previously executed job (first job).

This screen can prompt the user to confirm the settings changed from the default settings of the transmission job (second job), thus eliminating execution errors of the transmission job with incorrect settings. On the other hand, if the processing in step S709 is skipped based on the determination result in step S708, settings which may be changed in step S709 and other settings are distinctly displayed.

FIG. 9 shows an example of the setting confirmation screen displayed by the MFP 110 according to the first embodiment. FIG. 9 displays, as settings which are not inherited from the previously executed job (first job), a color mode "monochrome"→"full-color" and an imposition setting "2in1"→"OFF". Thus, the user can confirm that the previous job includes a color mode "monochrome" and imposition setting "2in1", but the current transmission job includes a color mode "full-color" and imposition setting "OFF".

This screen can prompt the user to confirm the settings which may be changed from the default settings of the transmission job (second job) and are not changed, thus eliminating execution errors of the transmission job with incorrect settings.

When the user confirms the settings on the screen shown in FIG. 8 or 9 and presses an "OK" button, this confirmation processing ends.

Referring back to FIG. 7, after the processing in step S706 or S711, the CPU 111 accepts a setting change instruction of the print job generated in step S705 or the transmission job generated in step S710 from the command input unit 115 in step S712. The process then advances to step S713, and the CPU 111 executes print processing of an image (when steps S705 and S706 are executed) or transmission processing of an image file (when steps S707 to S711 are executed) as a re-execution job (second job) according to the generated print job or transmission job. Upon completion of the re-execution job, the process advances to step S714.

In step S714, the CPU 111 saves information indicating a print result of the print job in step S713, print job settings (when the re-execution job is the print job), and image data ID in the HDD 113 as a history of the print job. Alternatively, the CPU 111 saves information indicating a transmission result of the transmission job in step S713, transmission job settings (when the re-execution job is the transmission job), and image data ID in the HDD 113 as a history of the transmission job. Then, this processing ends.

As described above, according to the first embodiment, the settings of the first job such as the print job or transmission job, which settings are stored as the history of the previously executed job, can be used as those of a print job or transmission job as a subsequent re-execution job (second job). Even when the type of the previously executed job is different from that of the re-execution job, the settings of the previously executed job can be reflected to those of the re-execution job.

Even when the settings of the previously executed job are not reflected to those of the re-execution job, the user can easily confirm differences between the settings of the previously executed job and re-execution job. Thus, occurrence of execution errors of the re-execution job with incorrect settings can be eliminated.

[Second Embodiment]

The second embodiment of the present invention will be described below. Note that since the arrangements of the respective apparatus and system arrangement according to this embodiment are the same as those in the first embodiment, a description thereof will not be repeated.

This embodiment will explain a case in which the user inputs a re-execution instruction of a job previously executed by the MFP 110 via a job history screen of a scan-transmission job which transmits data obtained by scanning a document as a job whose execution was instructed by the user by an operation on the MFP 110. Note that in this case, upon re-execution of a job previously executed by the MFP 110, not only the scan-transmission job but also a job of a different type (for example, a print job which prints an image) can also be executed.

Figure 10:
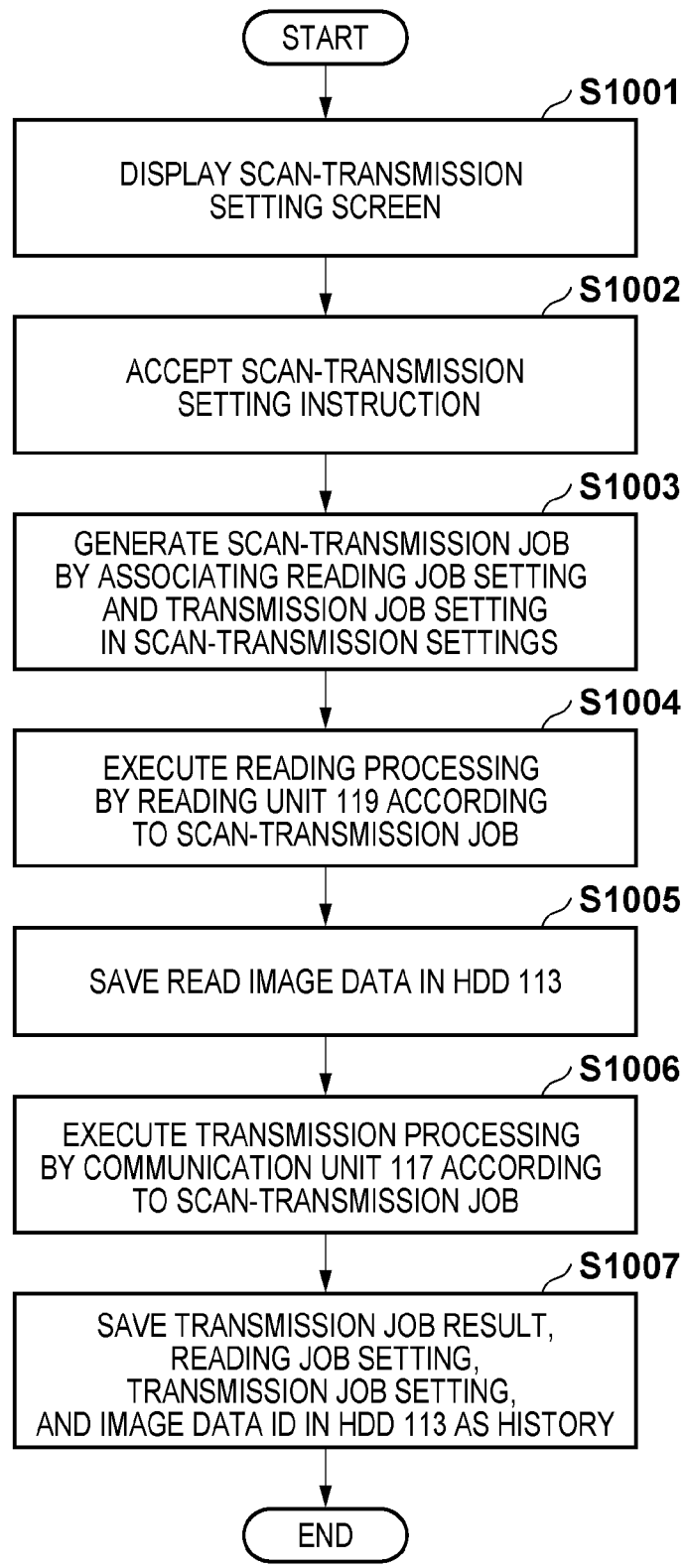
FIG. 10 is a flowchart for explaining the operation executed when an MFP according to the second embodiment of the present invention executes scan-transmission processing.

FIG. 10 is a flowchart for explaining the operation executed when the MFP 110 according to the second embodiment of the present invention executes scan-transmission processing. Note that a program required to implement this processing is installed in the HDD 113, is expanded on the RAM 112 when it is executed, and is executed under the control of the CPU 111.

In step S1001, the CPU 111 displays a screen which prompts the user to input scan-transmission settings on the display unit 116. The process then advances to step S1002, and the CPU 111 accepts a scan-transmission setting instruction input from the command input unit 115. After the setting instruction is accepted, the process advances to step S1003, and the CPU 111 acquires settings of a reading job and those of a transmission job from the scan-transmission settings, thus generating a scan-transmission job.

After the scan-transmission job is generated in this way, the process advances to step S1004, and the CPU 111 controls the reading unit 119 to read a document according to that scan-transmission job. The process then advances to step S1005, and the CPU 111 saves read image data in the HDD 113. In this case, an ID is assigned to the saved image data. The corresponding image data can be uniquely identified using that ID, and can be read out from the HDD 113.

After the image data is saved in this way, the process advances to step S1006, and the CPU 111 controls the communication unit 117 to execute transmission processing of the image data according to the scan-transmission job (execution of the transmission job). Upon completion of the transmission processing, the process advances to step S1007, and the CPU 111 saves information indicating a transmission result in step S1006, the reading job settings, the transmission job settings, and the image data ID in the HDD 113 as a history of the scan-transmission job, thus ending this processing.

In this way, by executing the scan-transmission job which scans a document and transmits scanned image data, the information indicating the transmission result, reading job settings, transmission job settings, and image data ID can be stored as a history of that scan-transmission job (first job).

FIG. 11 is a flowchart for explaining the operation executed when the MFP 110 according to the second embodiment of the present invention executes a re-execution job (second job) from a job history screen. Note that a program required to implement this processing is installed in the HDD 113, is expanded on the RAM 112 when it is executed, and is executed under the control of the CPU 111.

In step S1101, the CPU 111 displays the contents of the history of the previously executed scan-transmission job (first job) on the display unit 116. At this time, as in step S701, a button used to instruct to execute "re-print" or "re-transmission" is displayed in correspondence with each job history. The process then advances to step S1102, and the CPU 111 accepts a "re-print" or "re-transmission" instruction from the screen displayed in step S1101, which instruction is input from the command input unit 115, as in step S702. Upon acceptance of this instruction, the process advances to step S1103, and the CPU 111 acquires, from the HDD 113, the scan-transmission job settings and image data ID included in the history of the job (first job) corresponding to the accepted instruction. At this time, the CPU 111 acquires the image data from the HDD 113 based on that image data ID.

The process then advances to step S1104, and the CPU 111 determines whether the instruction accepted in step S1102 is the "re-print" or "re-transmission" instruction (whether or not a print job is instructed). If it is determined that the accepted instruction is the "re-transmission" instruction ("NO" in step S1104), the process advances to step S1105, and the CPU 111 generates, as a re-execution job, a transmission job according to the scan-transmission job settings and image data acquired in step S1103. After the transmission job (re-execution job) is generated, the process advances to step S1106, and the CPU 111 displays the setting contents of that transmission job on the display unit 116. Then, the process advances to step S1112.

On the other hand, if the "re-print" instruction is determined in step S1104 ("YES" in step S1104), the process advances to step S1107, and the CPU 111 reads out default settings of a print job from the HDD 113 to generate print job settings. This is because since the previously executed job is the scan-transmission job, settings of the print job designated as a re-execution job are not stored. The default settings of the print job are saved in advance in, for example, the HDD 113. When the CPU 111 executes print processing in the MFP 110, it displays the default settings on the display unit 116.

After the print job settings are generated in this way, the process advances to step S1108, and the CPU 111 determines whether or not settings similar to the print job settings of the scan-transmission job settings acquired in step S1103 are to be reflected to the print job settings. This determination can be implemented by a method using switch information saved in advance in, for example, the HDD 113. This switch information is obtained by saving the contents accepted from the user via the command input unit 115 independently of the operations according to this embodiment. Also, the determination in step S1108 can be implemented by a method of displaying a selection screen on the display unit 116, and accepting an input (selection instruction) from the user via the command input unit 115 after step S1107. With this determination, when the scan-transmission job settings include settings which are not suited as the print job, the print job can be executed using the default settings of the print job without reflecting those settings to the print job settings.

If it is determined in step S1108 that "not to reflect" is instructed, the process advances to step S1110, but if it is determined that "to reflect" is instructed, the process advances to step S1109. In step S1109, the CPU 111 identifies (selects) settings which can be used in the print job settings generated in step S1107 from the scan-transmission job settings acquired in step S1103. Then, the CPU 111 overwrites the identified settings on the print job settings. Thus, the CPU 111 reflects the identified settings to the print job settings.

An example in which the scan-transmission job settings are overwritten on the print job settings includes the following cases.

A color setting of the scan-transmission job is overwritten on that of an image of the print job.

A resolution setting of the scan-transmission job is overwritten on that of the print job.

An enlargement/reduction setting for image data of an image file to be transmitted by the scan-transmission job is overwritten on that for original image data of the print job.

A page number assignment setting to image data of an image file to be transmitted by the scan-transmission job is overwritten on a print setting of a page number of the print job.

An imposition (layout) setting for image data of an image file to be transmitted by the scan-transmission job is overwritten on that of the print job.

In another example, transmission job settings to be set as attribute information of an image file to be transmitted by the scan-transmission job are used as the print job settings. For example, this example includes the following cases.

A print setting (enlargement/reduction setting) of an image file to be transmitted by the scan-transmission job is overwritten on an enlargement/reduction setting for original image data of the print job.

A print setting (page number assignment setting) of an image file to be transmitted by the scan-transmission job is overwritten on a print setting of a page number of the print job.

A print setting (imposition setting) of an image file to be transmitted by the scan-transmission job is overwritten on an imposition setting of the print job.

An example in which a setting of the scan-transmission job is not overwritten on that of the print job includes the following cases.

A destination setting of the scan-transmission job is not overwritten.

An image file type setting of the scan-transmission job is not overwritten.

An image file name setting of the scan-transmission job is not overwritten.

When a given setting of the scan-transmission job is overwritten on that of print job to unwantedly generate a setting which cannot be executed by the authority of the user who instructed a re-execution job (print job), overwriting by the setting of the scan-transmission job is skipped.

In this way, the process advances to step S1110, and the CPU 111 generates a print job (second job) as a re-execution job according to the print job settings set in the previous processing and the image data acquired in step S1103. After the print job is generated in this way, the process advances to step S1111, and the CPU 111 displays the setting contents of that print job on the display unit 116. The process then advances to step S1112. In the display processing in step S1111, when the default settings of the print job in step S1107 have been changed by the processing in step S1109, the changed settings and other settings which are not changed are distinctly displayed. FIG. 8 above shows this display example.

This screen can prompt the user to confirm the settings changed from the default settings of the print job, thus eliminating execution errors of the print job as a re-execution job with incorrect settings. On the other hand, if the processing in step S1109 is skipped based on the determination result in step S1108, settings of the print job which may be changed in step S1109 and other settings are distinctly displayed. This display processing is as has been described above using FIG. 9.

This screen can prompt the user to confirm the settings which may be changed from the default settings of the print job (second job) as a re-execution job and are not changed. Thus, a situation in which the user erroneously executes a print job (re-execution job) with incorrect settings can be eliminated.

After the setting display processing of the re-execution job in step S1106 or S1111 is executed, the process advances to step S1112. In step S1112, the CPU 111 accepts a setting change instruction of the transmission job (re-execution job) generated in step S1105 or the print job (re-execution job) generated in step S1110 from the command input unit 115. The process then advances to step S1113, and the CPU 111 executes print processing of an image or transmission processing of an image file according to the print job or transmission job as a re-execution job (second job).

Upon completion of the re-execution job, the process advances to step S1114, and the CPU 111 saves information indicating a print result of the print job in step S1113, print job settings (when the re-execution job is the print job), and image data ID in the HDD 113 as a history of the print job. Alternatively, the CPU 111 saves information indicating a transmission result of the transmission job in step S1113, transmission job settings (when the re-execution job is the transmission job), and image data ID in the HDD 113 as a history of the transmission job. When the execution result of the re-execution job is saved, this processing ends.

As described above, according to the second embodiment, the settings of the scan-transmission job (first job) stored as a history of the previously executed job can be used as those of the print job or transmission job as a subsequent re-execution job (second job). Even when the type of the previously executed job is different from that of the re-execution job, the settings of the previously executed job can be reflected to those of the re-execution job.

Even when the settings of the previously executed job are not reflected to those of the re-execution job, the user can easily confirm differences between the settings of the previously executed job and re-execution job. Thus, occurrence of execution errors of the re-execution job with incorrect settings can be eliminated.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-185256, filed Aug. 26, 2011, which is hereby incorporated by reference herein in its entirety.

What is claimed is:

1. An information processing apparatus comprising:
a first execution unit configured to execute a print job for printing image data;
an acceptance unit configured to accept an instruction to execute a transmission job for transmitting image data using a history of the print job executed by said first execution unit;
an identifying unit configured to, in a case where said acceptance unit accepts the instruction, identify settings allowed to be used for the transmission job indicated by the instruction from among settings of the print job executed by said first execution unit; and
a second execution unit configured to execute the transmission job according to the settings identified by said identifying unit.

2. The apparatus according to claim 1, wherein said second execution unit is configured to execute the transmission job according to settings obtained by reflecting the settings identified by said identifying unit to default settings of the transmission job.

3. The apparatus according to claim 1, wherein said identifying unit is configured to identify, as the settings allowed to be used for the transmission job, settings selected according to a user instruction of the settings of the print job which are allowed to be used for the transmission job.

4. The apparatus according to claim 1, wherein said identifying unit is configured to identify at least one of a color setting of the print job, a page number print setting of the print job, a print layout setting of the print job, and a document name of image data of the print job.

5. The apparatus according to claim 1, further comprising a saving unit configured to save information indicating an execution result of the transmission job by said second execution unit and the settings of the transmission job as a job history.

6. The apparatus according to claim 1, wherein said second execution unit is configured to execute the transmission job based on image data of the print job.

7. A control method of an information processing apparatus, comprising:
a first executing step of executing a print job for printing image data;

an accepting step of accepting an instruction to execute a transmission job for transmitting image data using a history of the print job executed in the first executing step;

an identifying step of identifying, in a case where the instruction is accepted in the accepting step, settings allowed to be used for the transmission job indicated by the instruction from among settings of the print job executed in the first executing step; and a second executing step of executing the transmission job according to the settings identified in the identifying step.

8. An information processing apparatus comprising:
a first execution unit configured to execute a transmission job for transmitting image data;
an acceptance unit configured to accept an instruction to execute a print job for printing image data using a history of the transmission job executed by said first execution unit;
an identifying unit configured to, in a case where said acceptance unit accepts the instruction, identify settings allowed to be used for the print job indicated by the instruction from among settings of the transmission job executed by said first execution unit; and
a second execution unit configured to execute the print job according to the settings identified by said identifying unit.

9. The apparatus according to claim 8, wherein said second execution unit is configured to execute the print job according to settings obtained by reflecting the settings identified by said identifying unit to default settings of the print job.

10. The apparatus according to claim 8, wherein said identifying unit is configured to identify, as the settings allowed to be used for the print job, settings selected according to a user instruction of the settings of the transmission job which are allowed to be used for the print job.

11. The apparatus according to claim 8, wherein said identifying unit is configured to identify at least one of a color setting of the transmission job, a resolution setting of image data to be transmitted by the transmission job, an enlargement or reduction setting for the image data to be transmitted, a setting for assigning a page number to the image data to be transmitted, and a layout setting of the image data to be transmitted.

12. The apparatus according to claim 8, further comprising a saving unit configured to save information indicating an execution result of the print job by said second execution unit and the settings of the print job as a job history.

13. The apparatus according to claim 8, wherein said second execution unit is configured to execute the print job based on image data of the transmission job.

14. A control method of an information processing apparatus, comprising:
a first executing step of executing a transmission job for transmitting image data;
an accepting step of accepting an instruction to execute a print job for printing image data using a history of the transmission job executed in the first executing step;
an identifying step of identifying, in a case where the instruction is accepted in the accepting step, settings allowed to be used for the print job indicated by the instruction from among settings of the transmission job executed in the first executing step; and
a second executing step of executing the print job according to the settings identified in the identifying step.

* * * * *